US005235155A

United States Patent [19]

Yamada et al.

[11] Patent Number: 5,235,155

[45] Date of Patent: Aug. 10, 1993

[54] PLASMA CUTTING DEVICE

[75] Inventors: Osamu Yamada, Aichi; Hisaaki Yamane, Kasugai; Kunio Kohsaka, Nagoya, all of Japan

[73] Assignee: Brother Kogyo Kabushiki Kaisha, Nagoya, Japan

[21] Appl. No.: 592,818

[22] Filed: Oct. 4, 1990

[30] Foreign Application Priority Data

Oct. 23, 1989 [JP] Japan ................................ 1-275392

[51] Int. Cl.[5] ................................................ B23K 9/00

[52] U.S. Cl. .......................... 219/121.39; 219/121.51; 219/121.55; 219/75

[58] Field of Search ...................... 219/121.39, 121.59, 219/121.44, 121.48, 121.51, 121.5, 121.54, 121.55, 75

[56] References Cited

U.S. PATENT DOCUMENTS

| | | | |
|---|---|---|---|
| 3,375,392 | 3/1968 | Brzozowski et al. | 219/75 |
| 3,594,609 | 7/1971 | Vas | 219/121.39 |
| 3,641,308 | 2/1972 | Couch, Jr. et al. | 219/75 |
| 4,163,891 | 8/1979 | Komatsu et al. | 219/121.5 |
| 4,382,170 | 5/1983 | Klingel | 219/121.5 |
| 4,495,399 | 1/1985 | Cann | 219/121.44 |
| 4,902,871 | 2/1990 | Sanders et al. | 219/121.51 |

FOREIGN PATENT DOCUMENTS

| | | | |
|---|---|---|---|
| 0180378 | 7/1988 | Japan | 219/121.51 |

*Primary Examiner*—Mark H. Paschall
*Attorney, Agent, or Firm*—Oliff & Berridge

[57] ABSTRACT

The plasma cutting device of the present invention comprises a plurality of release ports for releasing the work gas to prevent adverse influence on the cutting processing besides the exhaust port for jetting the gas toward the work. Accordingly the flow rate and velocity of the swirl flow are increased and the flow rate of the jet gas is still kept the same as that in the conventional device, resulting in stabilizing the plasma arc and performing superior cutting.

15 Claims, 3 Drawing Sheets

RELATED ART

PLASMA CUTTING DEVICE

BACKGROUND OF THE INVENTION

The present invention relates to a plasma cutting device, and in particular to the one in which work gas is made revolving around the plasma arc.

Currently, a plasma cutting device has an electrode with a flat head in which hafnium, zirconium and the like is embedded. As shown in FIG. 2, such a plasma cutting device is further provided with a supply port 8 formed through a guide can 9 for making work gas 1 revolve. The guide can 9 insulates an electrode 5 from a nozzle 10 having an exhaust port 17. A swirl flow 7 of work gas 1 supplied from the supply port 8 into a swirl flow space 11 keeps plasma arc 13 in the vicinity of a center line 20 of the electrode 5. The swirl flow 7 is then jetted as jet gas 16 from the exhaust port 17 toward a work 14 to be cut.

In the related art plasma cutting device, activated gas, such as air, oxygen or the like has been increasingly used in order to cut the soft steel. This is because such activated gas will accelerate the cut speed owing to the heated work through oxidation and eliminate melt produced at the cut part by oxidizing the melt. In the above case, the flow rate of the work gas jetted from the exhaust port of the nozzle should not exceed the amount required for oxidizing the melt of the work to remove the resulted oxide away. It is widely known that otherwise the surface roughness of the cut surface will be deteriorated.

In the aforementioned conventional plasma cutting device, the flow rate of the jet gas jetted from the nozzle is equivalent to that of the swirl gas. In order to keep the plasma arc around the center line of the electrode for improving the cut surface, both flow rate and velocity of the swirl gas are required to be increased. However, this will also increase the flow rate of the jet gas more than necessary, resulting in deteriorating the cut surface.

SUMMARY OF THE INVENTION

The object of the invention is to solve the aforementioned problem by providing the plasma cutting device in which the flow rate of the gas jetted from the exhaust port of the nozzle is kept optimum for good cutting. Such device will provide superior cutting by increasing only flow rate and velocity of the swirl gas which stabilizes the plasma arc.

In order to attain the aforementioned object, the plasma cutting device of this invention is provided with a plurality of release ports. They are formed just above the exhaust port in the nozzle for releasing part of the work gas to be jetted in such a direction that the gas will not adversely influence the cutting process.

In the plasma cutting device of the invention constructed as above, the work gas supplied from the supply port is made into a swirl flow within the nozzle. The swirl flow revolves around the plasma arc generated between the electrode and the work. Then the gas is released from the release ports as well as the exhaust port, which increases the number of the flow paths through which the gas is discharged. The flow rate of the gas jetted from the inside to the outside of the nozzle is increased. The flow velocity of the swirl gas, thus, is increased, by which the plasma arc becomes more stable condition in the vicinity of the center line of the electrode than the conventional device. Part of the swirl gas increased to be more than the conventional one is released from newly formed release ports in such a direction that the swirl gas will not adversely influence the cutting process. By this the flow rate of the gas jetted to the work is not increased, thereby keeping optimum flow rate of the gas required for the cutting process.

DESCRIPTION OF THE PREFERRED EMBODIMENT

Figure 1:
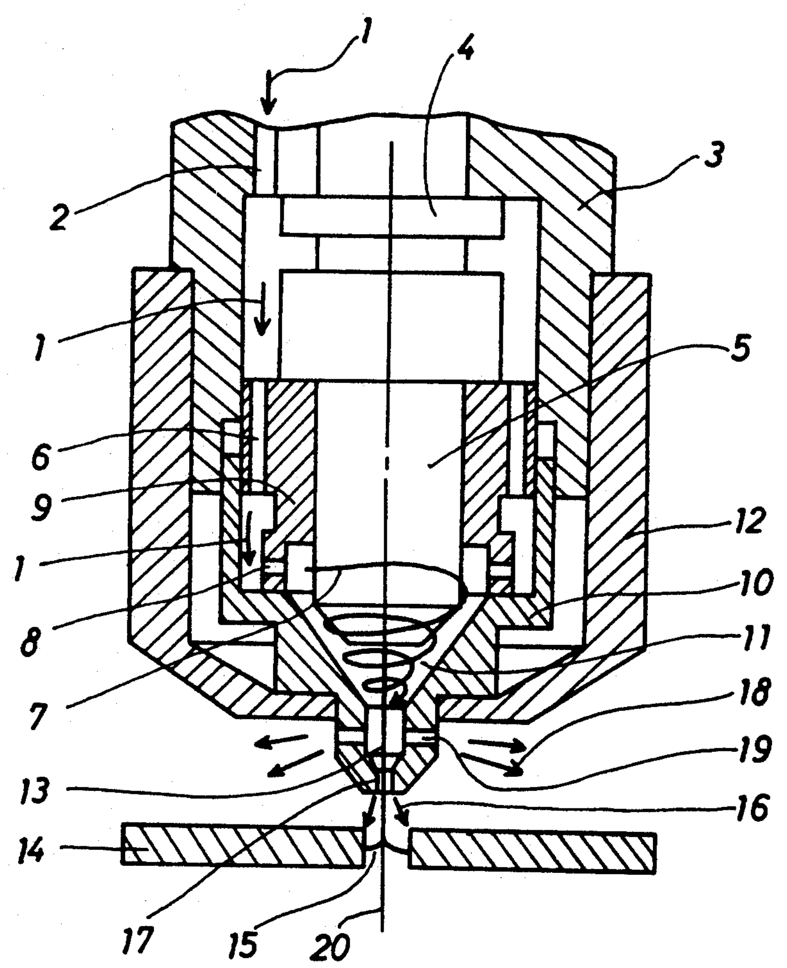
FIG. 1 is a sectional view showing an embodiment of the invention.
Figure 2:
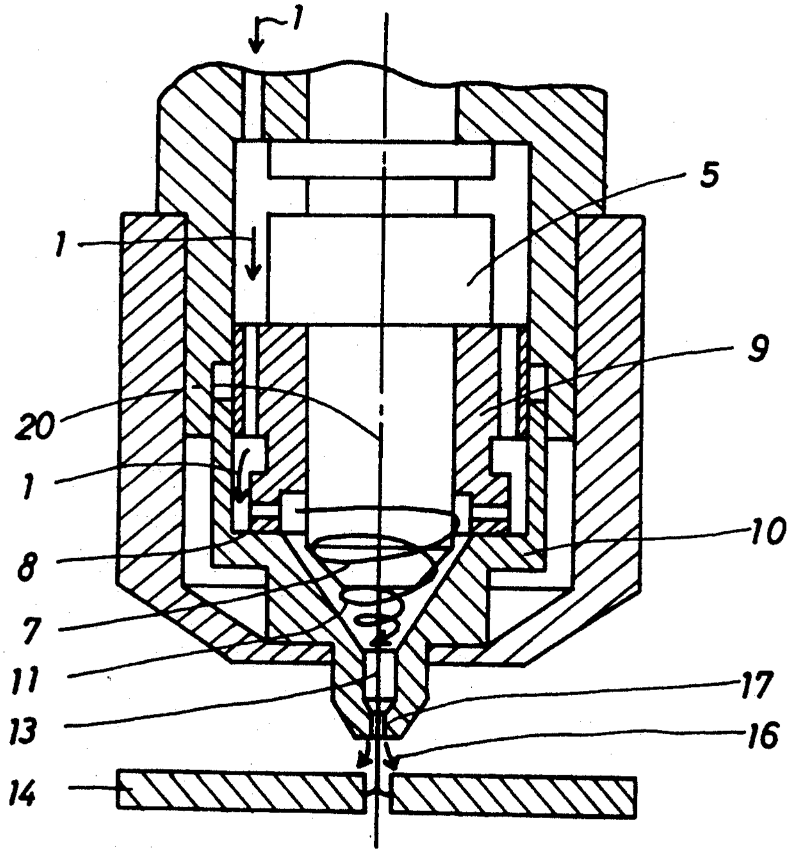
FIG. 2 is a sectional view showing a construction of the related art.
Figure 3:
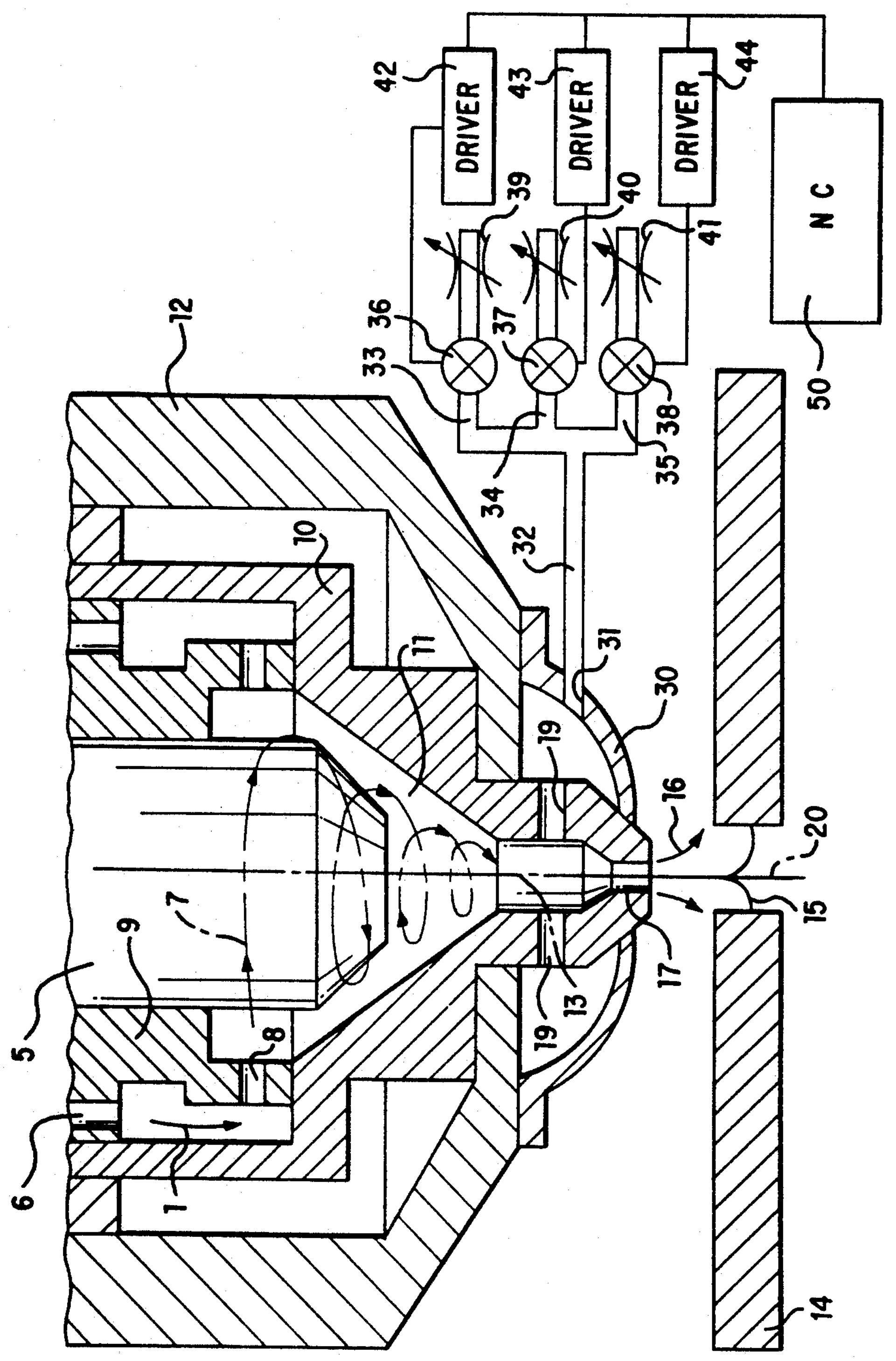
FIG. 3 is a sectional view showing the device according to the present invention.

An example of the embodiment of the invention will be explained referring to the drawings.

Referring to FIG. 1, a torch 3 having the first flow path 2 through which work gas 1 flows is provided with an introduction portion 4 where an electrode 5 is engaged. The electrode 5 is engaged with a guide can 9. The guide can 9 functions as an insulator and is provided with the second flow path 6 through which the gas 1 flows, and a supply port 8 for making the gas 1 a swirl flow 7. The upper end of a nozzle 10 is engaged between the guide can 9 and the torch 3. A swirl flow space 11 is formed between the nozzle 10 and the guide can 9. The electrode 5, the guide can 9, and the nozzle 10 are fixed to the torch with a nozzle cover 12.

An exhaust port 17 for jetting the swirl flow 7 as jet gas 16 is formed at the end of the nozzle 10. The jet gas 16 is jetted toward a cutting part 15 of a work 14 by means of plasma arc 13 generated in the vicinity of the center line 20 of the electrode 5 between the electrode 5 and the work 14. A plurality of release ports 19 are formed above the exhaust port 17 for releasing part of the swirl flow 7 as released gas 18, thereby preventing adverse influence by the swirl flow 7 on the cutting processing at the part 15.

The embodiment is constructed as described above. Its function will now be explained.

A predetermined pressure is applied between the electrode 5 and the nozzle 10 to generate the plasma arc 13 therebetween. At the same time the work gas 1 is supplied to the supply port 8 through the first flow path 2 in the torch 3 and the second path 6 in the guide can 9. The work gas 1 is made into the swirl flow 7 from the supply port 8 to be supplied to the space 11.

At predetermined flow rate and velocity, the swirl flow 7 so functions as to stabilize the plasma arc 13 to be in the vicinity of the center line 20 of the electrode 5. Part of the swirl flow is released as the released gas 18 from the release ports 19, thereby preventing adverse influence by the swirl flow 7 on the cutting part 15 of the work 14. The swirl flow 7 which is not released from the ports 19 is jetted as the jet gas 16 from the exhaust port 17, toward the cut processing part 15 of the work 14.

At the bottom of a nozzle cover 12, an enclosure 30 is attached for covering a release port 19. The enclosure 30 includes a connecting hole 31. One end of a piping 32 is connected to the connecting hole 31, and the other end of the piping 32 is branched into three pipings 33, 34 and 35. The pipings 33, 34 and 35 are connected to solenoid valves 36, 37 and 38, and flow controlling valves 39, 40 and 41, respectively. The solenoid valves 36, 37 and 38 are also connected to drivers 42, 43 and 44, respectively. The drivers 42, 43 and 44 are connected to a numerical control unit 50. The flow controlling valves 39, 40 and 41 are manually set beforehand to their respective flow amount. Since the set flow amounts of the flow controlling valves 39, 40 and 41 differ from one another, the numerical control unit 50 selects either one of the solenoid valves 36, 37 and 38 according to the condition of a workpiece. The numerical control unit 50 drives the selected solenoid valve 36, 37 or 38 via the drivers 42, 43 or 44. The drivers 42, 43 and 44 drive the solenoid valves 36, 37 and 38 connected thereto to open. When not driven by the drivers 42, 43 and 44, the solenoid valves 36, 37, 38 are closed. Consequently, either one of the three pipings 33, 34 and 35, which is controlled to the optimum flow amount, is selected according to the condition of the workpiece.

In order to ascertain the effect of the invention, the cutting experiment has been conducted under the following conditions using oxygen as work gas, hafnium as an electrode, and SPCC-SD with thickness of 2.0 mm as a work piece.

| | |
|---|---|
| GAS PRESSURE | 4.0 $kg/cm^2$ |
| CUTTING CURRENT | 12 A |
| CUTTING SPEED | 20 mm/s |
| STAND-OFF | 0.5 mm |

For the purpose of comparison, the conventional device has been subject to the experiment under the same conditions. The results are shown in Table 1 as below.

TABLE 1

| | PRESENT INVENTION | CONVENTIONAL DEVICE |
|---|---|---|
| FLOW RATE (SWIRL FLOW RATE) | 10.0 Nl/min. | 4.5 Nl/min. |
| SURFACE ROUGHNESS | 4.5 μm | 8.0 μm |
| ADHESION OF DROSS | NONE | PRESENT |

As Table 1 clearly shows, in comparison with the conventional device, the flow rate of the gas (swirl flow rate) is increased, resulting in reduced surface roughness and preventing dross from adhering.

In this embodiment, a plurality of release ports are formed above the exhaust port, however, a single port is still available. The position of the release port may be changeable as long as part of the work gas is released in such a direction that the gas will not adversely influence the cutting process. It may be so constructed that the amount of the released gas from the release ports is adjustable with a check valve in response to the conditions such as the thickness of the work or the material to be used as the work.

It is also possible to be so construed that depending on cutting conditions, the flow rate of the released gas is automatically controlled upon an instruction under numerical control.

It is to be understood that this invention is not limited to the aforementioned embodiment, and various modifications may be made without departing from the spirit and scope of the invention.

What is claimed is:

1. A plasma cutting device, comprising:

a nozzle having a cavity;

an electrode mounted within the nozzle;

plasma arc generating means for generating a plasma arc extending between the electrode and a work piece;

a supply port through which work gas is introduced into the cavity within the nozzle so as to keep the plasma arc around a center line of the electrode;

an exhaust port through which the work gas is introduced from the nozzle onto the work piece; and release means for releasing part of the work gas which has been used for keeping the plasma arc around the center line of the electrode before the work gas is introduced through the exhaust port onto the work piece, said release means being provided adjacent to the exhaust port.

2. The plasma cutting device of claim 1, in which a plurality of release means are formed adjacent to the exhaust port.

3. The plasma cutting device of claim 1, further comprising a check valve mounted on the release means for adjusting an amount of work gas released through the release means.

4. The plasma cutting device of claim 1, in which said release means releases an amount of work gas in accordance with at least one condition chosen from the group consisting of a thickness of the work piece and a type of material used as the work piece.

5. The plasma cutting device of claim 1 in which the release means comprises one or more release ports.

6. The plasma cutting device of claim 1, in which the supply means causes the work gas to swirl around the plasma arc towards the exhaust port.

7. A plasma cutting device, comprising:

a guide can concentrically mounted within a torch end;

a nozzle concentrically mounted around the guide can within the torch end;

an electrode mounted within the guide can;

plasma arc generating means for generating a plasma arc extending between the electrode and a work piece;

a supply port formed in the guide can through which work gas is introduced into a cavity in the nozzle so as to keep the plasma arc around a center line of the electrode;

an exhaust port formed in the nozzle through which the work gas is introduced from the nozzle cavity onto the work piece, said supply port causing the work gas to swirl around the plasma arc towards the exhaust port; and release means for releasing part of the work gas which has been used for keeping the plasma arc around the center line of the electrode before the work gas is introduced through the exhaust port onto the work piece, said release means being provided adjacent to the exhaust port, said release means comprising at least one release port, a check valve being mounted on the at least one release port for adjusting an amount of work gas released through the at least one release port.

8. The plasma cutting device of claim 7, in which said release means releases an amount of work gas through the one or more release ports in accordance with at least one condition chosen from the group consisting of a thickness of the work piece and a type of material used as the work piece.

9. The plasma cutting device of claim 7, further comprising:

flow control means for controlling an amount of work gas released through the one or more release ports; and numerical control means for controlling the flow control means to release a certain amount of gas through the one or more release ports.

10. A plasma cutting device, comprising:

a guide can concentrically mounted within an end of a torch;

a nozzle concentrically mounted around the guide can within the torch end;

an electrode mounted within the guide can;

plasma arc generating means for generating a plasma arc extending between the electrode and a work piece;

a first flow path formed in the torch end through which work gas is introduced into a torch end cavity in the torch end;

a second flow path formed in the guide can through which work gas is introduced from the torch end cavity into a guide can cavity between the guide can and the nozzle;

a supply port formed in the guide can through which work gas is introduced from the guide can cavity into a nozzle cavity in the nozzle so as to keep the plasma arc around a center line of the electrode;

an exhaust port formed in the nozzle through which the work gas is introduced from the nozzle cavity onto the work piece; and a plurality of release ports provided adjacent to the exhaust port for releasing part of the work gas which has been used for keeping the plasma arc around the center line of the electrode before the work gas is introduced through the exhaust port onto the work piece, said release ports releasing an amount of work gas determined according to at least one condition chosen from the group consisting of a thickness of the work piece and a type of material used as the work piece.

11. The plasma cutting device of claim 10, in which the supply port causes the work gas to swirl around the plasma arc towards the exhaust port.

12. The plasma cutting device of claim 11, in which the nozzle cavity is generally conical in shape, with the exhaust port being formed at the point of the conically shaped nozzle cavity.

13. The plasma cutting device of claim 12, further comprising a nozzle cover 12 concentrically mounted around the nozzle and the torch end for holding the nozzle onto the torch end.

14. The plasma cutting device of claim 13, further comprising a check valve mounted on the one or more release ports for adjusting the amount of work gas released through the one or more release ports.

15. The plasma cutting device of claim 13, further comprising:

flow control means for variably controlling an amount of gas released through the one or more release ports; and numerical control means for controlling the flow control means to release a certain amount of gas through the one or more release ports.

* * * * *